July 17, 1956  H. R. WILSON  2,754,961

BEAD SPACER FOR TUBELESS TIRES

Filed Feb. 2, 1953

INVENTOR.
HUBERT R. WILSON
BY W. A. Fraser
ATTY.

United States Patent Office 2,754,961
Patented July 17, 1956

2,754,961
BEAD SPACER FOR TUBELESS TIRES

Hubert R. Wilson, Clinton, Ohio, assignor to The Firestone Tire & Rubber Company, Akron, Ohio, a corporation of Ohio Application February 2, 1953, Serial No. 334,611

1 Claim. (Cl. 206—46)

This invention relates to tubeless tires and more particularly to means for holding the beads of tubeless tires spaced apart during shipping and storage to facilitate the mounting and inflation of such tires on rims.

Tubeless tires present a problem of inflation if the beads of the tire are pressed closed together as the result of piling the tires in tiers during shipping and storage. The tire beads tend to "set" in this compressed position and when a tire is mounted on a drop-center rim, the beads tend to remain in the well of the rim spaced from the bead seats. The result is that an initial seal cannot be obtained and inflationary air tends to be lost as fast as it enters the tire.

To prevent this condition, the present invention provides a corrugated board spacer in the shape of a flat strip folded to form a polygon having a perimeter equal to or somewhat greater than the inside diameter of the tire beads. The strip is adapted to be wedged in position between the beads of the tire in a manner to hold the beads spaced apart by the required amount. The spacer is cheap and easy to make, is mechanically strong and is effective for the desired purpose.

It is accordingly an object of the present invention to provide a spacer for the beads of a tubeless tire which will hold the beads apart until the time of use and prevent them from taking a "set" in a closely spaced position.

Another object is to provide a spacer for the beads of a tubeless tire which is cheap and easy to make.

Another object is to provide a spacer for tubeless tires comprising a corrugated board strip which can be easily inserted and removed in a tubeless tire.

Further objects and advantages will more fully appear from the following description of a preferred form of the invention, reference being had to the accompanying drawing in which.

Figure 1:
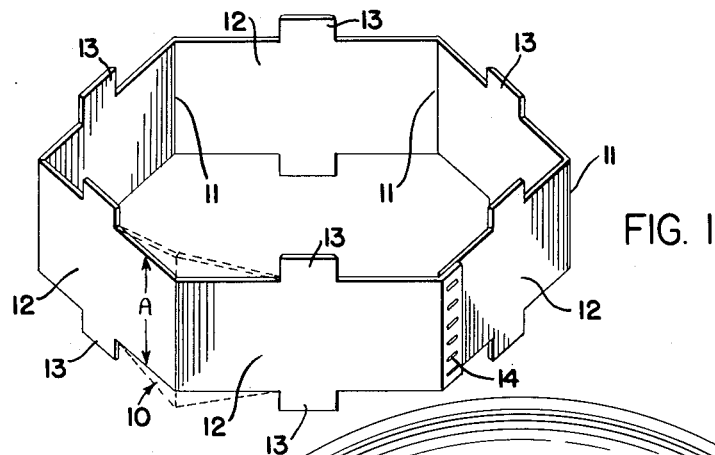
Figure 1 is a perspective view of a corrugated board spacer embodying the invention.

Now referring to the drawing, the invention is shown as embodied in a spacer, indicated generally at 10, comprising a flat strip of corrugated board folded about transversely extending lines 11 to form a hexagon, the sides of which are indicated at 12. The hexagon is closed by stapling a flap 14 at one end of the strip to the other end of the strip as shown. The corners of the hexagon are cut away adjacent the fold lines to form oppositely disposed, laterally protruding tabs 13.

Figure 2:
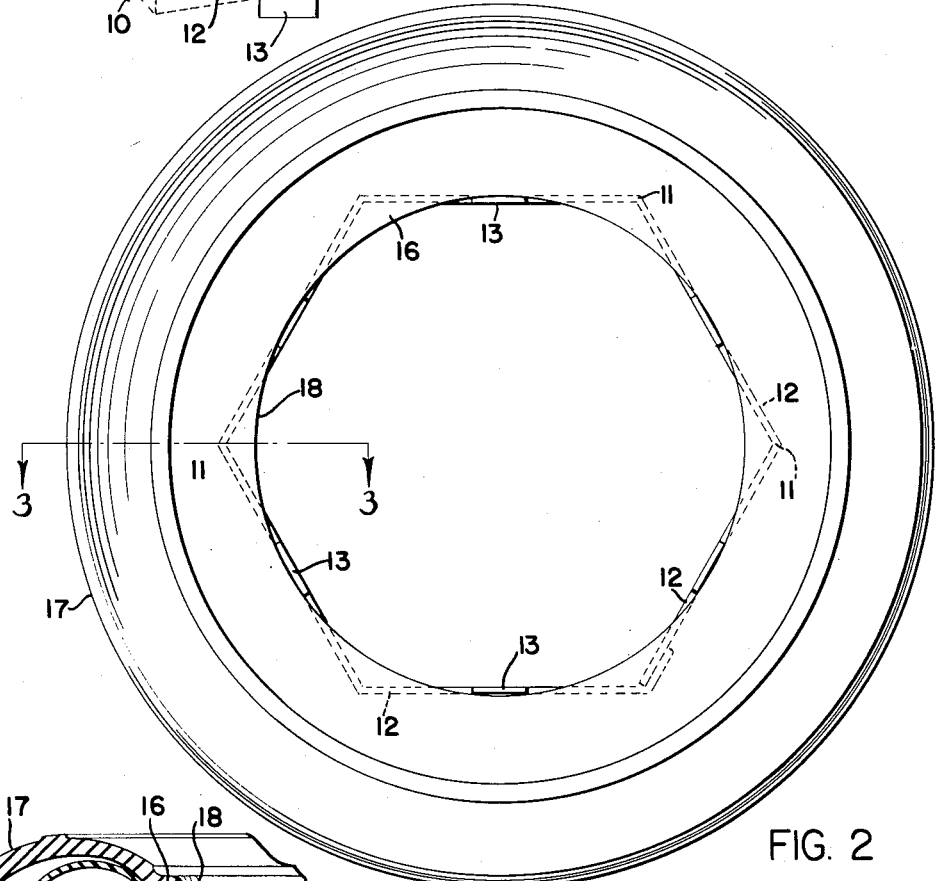
Figure 2 is a sectional view of a tubeless tire showing the spacer of Figure 1 installed therein.
Figure 3:
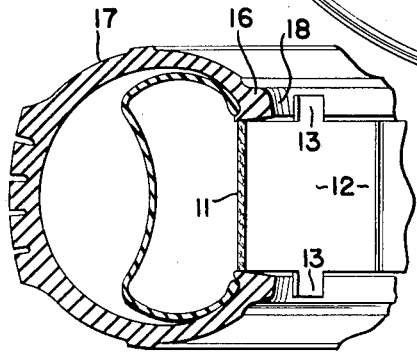
Figure 3 is a transverse sectional view taken in the plane 3—3 of Figure 2.

The corrugated board spacer is adapted to be inserted between the beads 16 of a tubeless tire 17 as shown in Figure 2, with the cut-away corners of the spacer lying between the beads of the tire and extending into the interior of the tire and with the tabs 13 lying substantially flat and resting tightly against the interior surfaces 18 of the beads of the tire. The width of the strip indicated at "A" in Figure 1 is substantially equal to or perhaps slightly greater than the bead width of the tire when it is mounted on the rim. The tabs 13 have the function of preventing the spacer from falling into the tire or becoming otherwise displaced since the diameter or the perimeter of the hexagon spacer is somewhat greater than the inside diameter of the tire beads, there is little likelihood of the spacer becoming dislodged from the tire beads.

In a modification of the spacer of Figure 1, the corners of the polygon may be increased slightly in width so that the edges taper uniformly or substantially uniformly toward the tabs 13, as shown. This construction is indicated in dotted lines in Figure 1 for one of the corners of the polygon. Only one such corner is shown with the indicated modification but it will be understood in the modification each one of the corners will be so modified. With this construction, the corners of the polygon will tend to extend slightly under the beads of the tire so that the spacer and the tire will securely interlock.

A spacer of the present invention is effective in maintaining the desired bead width, it is cheap and easy to construct and it has ample mechanical strength to do the required job. Although the invention is shown in hexagonal form, other polygonal shapes may be used without sacrificing any of the advantages of the invention and without departing from the scope of the present invention, the essential features of which are summarized in the claim below.

What is claimed is:

In combination, a tubeless tire and a spacer adapted to hold the beads of said tire in spaced apart relation, said spacer comprising a flat strip of relatively stiff material folded about a plurality of spaced lines extending transversely of the strip to form a flat-sided, closed polygon, said strip being cut away along both edges adjacent the corners of said polygon whereby to form oppositely disposed laterally extending tabs at about the middle portions of the flat sides of said polygon, said spacer being partially inserted in said tire with the sides thereof lying substantially tangential to the inner surfaces of said tire beads and with said tabs lying flat against the inside seating surfaces of said beads and with said cutaway corners extending between and being wedged firmly against said tire beads.

References Cited in the file of this patent

UNITED STATES PATENTS

| | | |
|---|---|---|
| 1,388,840 | Angier | Aug. 30, 1921 |
| 1,504,733 | Angier et al. | Aug. 12, 1924 |
| 2,304,373 | Palmer | Dec. 8, 1942 |
| 2,573,664 | Herzegh | Oct. 30, 1951 |